(12) United States Patent
Parekh et al.

(10) Patent No.: US 6,803,401 B2
(45) Date of Patent: Oct. 12, 2004

(54) HALOGEN SCAVENGER FOR OLEFIN FORMULATIONS

(75) Inventors: Jawahar C. Parekh, Livingston, NJ (US); Rajanikant D. Desai, Andover, NJ (US)

(73) Assignee: Reheis, Inc., Berkeley Heights, NJ (US)

( * ) Notice: Subject to any disclaimer, the term of this patent is extended or adjusted under 35 U.S.C. 154(b) by 292 days.

(21) Appl. No.: 09/960,097

(22) Filed: Sep. 21, 2001

(65) Prior Publication Data

US 2003/0100647 A1 May 29, 2003

Related U.S. Application Data

(63) Continuation-in-part of application No. 08/959,968, filed on Oct. 24, 1997.

(51) Int. Cl.$^7$ ................................. C08K 5/04
(52) U.S. Cl. .............. 524/394; 524/436; 423/115; 423/430; 554/75; 554/76
(58) Field of Search ................. 524/394, 436; 554/75, 76; 423/115, 430

(56) References Cited

U.S. PATENT DOCUMENTS

| | | | |
|---|---|---|---|
| 3,539,306 A | 11/1970 | Kumura et al. ............. 23/315 |
| 3,650,704 A | 3/1972 | Kumura et al. ............. 23/315 |
| 3,879,525 A | 4/1975 | Miyata et al. .............. 423/277 |
| 4,085,088 A | 4/1978 | Miyata et al. ......... 260/45.7 R |
| 4,154,718 A | 5/1979 | Miyata et al. ........... 260/42.14 |
| 4,284,762 A | 8/1981 | Miyata et al. ............. 528/485 |
| 4,299,759 A | 11/1981 | Miyata et al. ......... 260/45.7 R |
| 4,379,882 A | 4/1983 | Miyata ....................... 524/436 |
| 4,447,417 A | 5/1984 | Spickett et al. ............. 424/156 |
| 4,539,195 A | 9/1985 | Schanz et al. ........... 423/419 P |
| 4,560,545 A | 12/1985 | Spickett et al. ............. 423/430 |
| 4,576,819 A | 3/1986 | Miyata et al. .............. 424/156 |
| 4,675,356 A | 6/1987 | Miyata ....................... 524/424 |
| 4,761,188 A | 8/1988 | Miyata ....................... 148/6.2 |
| 4,774,212 A | 9/1988 | Drezdon ....................... 502/62 |
| 4,970,191 A | 11/1990 | Schutz ........................ 502/341 |
| 5,142,077 A | 8/1992 | Martin et al. ................. 554/76 |
| 5,169,967 A | 12/1992 | Assmus et al. ............... 554/71 |
| RE34,164 E | 1/1993 | Misra ......................... 423/115 |
| 5,246,899 A | 9/1993 | Bhattacharyya .............. 502/84 |
| 5,250,279 A | 10/1993 | Preston et al. .............. 423/432 |
| 5,362,457 A | 11/1994 | Grubbs et al. .............. 423/115 |

FOREIGN PATENT DOCUMENTS

| | | |
|---|---|---|
| DE | 3306822 | 1/1985 |
| EP | 0 282 619 A1 | 9/1988 |
| EP | 0 301 509 A1 | 2/1989 |
| FR | 1532167 | 5/1968 |
| GB | 1086779 | 10/1967 |
| GB | 1185920 | 3/1970 |
| WO | WO 92/20619 | 11/1992 |
| WO | WO 93/22237 | 11/1993 |

OTHER PUBLICATIONS

Hung. Teljes HU 30,453: Javor, Tibor et al., (Abstract 101:43635g from Chemical Abstract Services) *Pharmaceuticals* 101:327, (1984).

Product Brochure for "L–55R® Acid Neutralizers for Polymers", REHEIS® Incorporated.

F. Cavani et al., "Hydrotalcite–Type Anionic Clays: Preparation, Properties and Applications", Catalysis Today, vol. 11, Jan. 1, 1991, pp. 173–291.

*Primary Examiner*—Peter D. Mulcahy
(74) *Attorney, Agent, or Firm*—Arthur J. Plantamura (57) ABSTRACT

A halogen scavenging system is provided for inhibiting the corrosion-causing tendency and coloration of halogen-containing olefin polymers or copolymers, comprising incorporating about 0.01% to about 1% of a hydroltalcite-like solid solution having the formula $Al_2(Mg)_a(OH)_b(CO_3)_c(G)_d \cdot eH_2O$ and a crystallite size in the <003> direction of about 190 Å to about 225 Å, and having bidentate coordination for carbonate ion as shown by an infrared spectrum, and wherein $3 \leq a \leq 5.5$; $8 \leq b \leq 14$; $1.2 \leq c \leq 3$; $0 \leq d \leq 1$; $1 \leq e \leq 10$ and G is a surface active agent into the halogen containing olefin polymer.

20 Claims, 1 Drawing Sheet

HALOGEN SCAVENGER FOR OLEFIN FORMULATIONS

This application is a continuation-in-part of application Ser. No. 08/959,968 filed Oct. 24, 1997.

FIELD OF THE INVENTION

The invention relates to hydrotalcite-like compositions useful as halogen scavengers in polymer formulations. More particularly, the invention related to the use of aluminum magnesium hydroxy carbonate solid solutions that inhibit the adverse effect of halide catalyst residues in plastics.

BACKGROUND OF THE INVENTION

In general during the preparation of various synthetic polymers the catalyst, used in the preparation or at least the residue thereof almost invariably remains in the final product. The removal of this catalyst residue substance, which may be present at levels as low as ten parts per million, is commercially impractical. However, leaving the catalyst in the polymer, even at such low concentrations, often causes problems.

The catalysts used to polymerize olefinic monomers are typically halogen-containing metallic or organometallic compounds, e.g., Ziegler-Natta catalysts containing titanium tetrachloride. It is reported that residual titanium chloride species in the polymers interfere with the functioning of stabilizers, e.g., antioxidants, that are typically compounded with the polymer. Residual catalyst may also catalyze polymer degradation reactions, and, particularly with halogen-containing catalyst residue, the halogens can promote corrosion of the equipment used to compound and process the polymer.

Polymers that have been compounded with stabilizers, particularly thermal and light, stabilizers, exhibit a discoloration, i.e., they develop a yellow or pinkish coloration. This has been attributed to the action of residual catalyst, and particularly halide ions, reacting with the stabilizers that have a phenol or a quinone functional group. The halide may react with the phenol group to generate a colored phenolate anion.

Since most residual catalysts are acidic, an approach to overcoming the problems associated with residual catalyst is to add a basic material to the polymer, to thereby neutralize the residual catalyst. Basic materials for this purpose are known in the art, and are commonly referred to as neutralizer compounds or halogen-scavenging compounds. One class of halogen-scavenging compound is hydrotalcite and hydrotalcite-like materials.

Hydrotalcite is the name given to a natural mineral having the chemical structure $Al_2Mg_6OH_{16}(CO_3).4H_2O$, which may also be written as $Al_2O_3.6MgO.CO_3.12H_2O$. Natural hydrotalcite is an example of a basic magnesium alumino-carbonate hydrate. As obtained from the earth, natural hydrotalcite is generally contaminated with other minerals such as penninite and muscovite, as well as various heavy metals. The impurity levels in natural hydrotalcite, as well as its scare occurrence around the world, have limited its commercial use giving use to the preparation of purified synthetic hydrotalcite. For example, U.S. Pat. No. 5,250,279 describes a method for the preparation of high purity synthetic hydrotalcite having a small platelet morphology by reacting a mixture of a magnesium source, such as magnesium oxide, with an alkali metal bicarbonate, solid alumina trihydrate and an alkali metal aluminate under aqueous hydrothermal conditions at a temperature of about 160–200° C. Preparation of synthetic hydrotalcite said to have a composition which matches natural hydrotalcite is found in, for example, U.S. Pat. Nos. 3,650,704 and 3,539,306.

The term "hydrotalcite" refers to a class of basic aluminum magnesium carbonate compounds or complexes having various lattice structures and compositions.

U.S. Pat. No. 4,284,762 (the '762 patent) for example discloses a hydrotalcite of the formula wherein x is greater than 0 but less than or equal to 0.5, m is a positive number, and $A^{n-}$ represents an anion having a valence of n, or a product resulting from the surface-coating of said hydrotalcite with an anionic surface-active agent. The hydrotalcite has a BET specific surface area of not more than 20 $m^2$/g, and a crystallite size, in the <003> direction of at least 600 Å, and preferably at least 1,000 Å.

U.S. Pat. No. 4,299,759 (the '759 patent) discloses a hydrotalcite of the same composition as set forth in the '762 patent, but having a BET specific surface area of not more than 30 $m^2$/g. The '759 patent discloses that the surface treatment, i.e., the addition of sodium stearate to the hydrotalcite particle, can be achieved by adding an aqueous solution of sodium stearate to a suspension of the hydrotalcite powder to cause chemical adsorption of the surface-active agent to the surface of the solid powder. The surface treatment agent is preferably present at a loading of about 1 to about 10% by weight, based on the weight of the hydrotalcite.

U.S. Pat. No. 4,560,545 relates to a process for preparing a basic aluminum magnesium carbonate of the formula

The process comprises heating an aqueous slurry of aluminum hydroxide, magnesium hydroxide and either ammonia or a water-soluble organic nitrogen-containing base, in the presence of carbon dioxide and at a temperature of between 70 and 100° C. at atmospheric pressure. The reaction time is from 1 to 12 hours, and the carbon dioxide is bubbled through the slurry during this time. The basic aluminum magnesium carbonate so produced may be used in pharmaceutical compositions.

Hungarian Patent HU 30,453 (Abstract No. 101:43635g, prepared by the Chemical Abstracts Service) discloses a composition with the formula

The composition is prepared by the reaction of $MgCl_2$ with $Na_2CO_3$ and Na orthoaluminate or $Al(OH)_3$ in the presence of NaOH.

U.S. Pat. No. 4,539,195 claims a crystalline basic aluminum magnesium carbonate of the formula:

in which x≧4, obtainable by hydrothermal reaction of aluminum hydroxide with magnesium hydroxide or magnesium oxide in the presence of carbonate ions in stoichiometric amounts under the influence of gravitational forces at a temperature of 50 to 100° C.

A basic magnesium aluminum carbonate of the formula is described in British Patent 1,086,779, wherein x can be 0.15 to 1.5, y can be varied from 0.3 to 2.5, and z is not less than 2.5.

U.S. Pat. No. 4,675,356 discloses a hydrotalcite solid solution represented by the following formula $$[(M_1^{2+})_{y1}(M_2^{2+})_{y2}]_{1-x}M_x^{3+}(OH)_2A_{x/n}{}^{n-} \cdot mH_2O$$

wherein $M_1^{2+}$ represents at least one divalent metal selected from the group consisting of Mg, Ca, Sr and Ba; $M_2^{2+}$ represents at least one divalent metal cation selected from the group consisting of Zn, Cd, Pb and Sn; $M^{3+}$ represents a trivalent metal cation, $A^{n-}$ represents an anion having a valency of n, and x, y1, y2 and m are positive numbers represented by the following expressions $0 < x \leq 0.5$, $0 < y1$, $0 < y2$, $0.5 \leq y1+y2 < 1$, and $0 \leq m < 2$; and to a resin composition comprising the above agent. The hydrotalcite of the '356 patent may be surface treated with, for example, anionic surface-active agents such as sodium stearate.

Reheis, Inc., Berkeley Heights, N.J., sells an aluminum magnesium hydroxy carbonate, trademark L55-R®, having an analysis of 14–18% aluminum oxide, 25–29% magnesium oxide, 15–19% sodium stearate and 8.5–13.5% carbon dioxide. L55-R® is a white, odorless powder having a bulk density of 0.19–0.35 g/cc and a particle size of 100% through 400 mesh (37 microns) and not less than 90% through 10 microns.

While the prior art describes several hydrotalcite and hydrotalcite-like materials, there remains a need in the art for a system in which the modification of polymeric materials, results in substantially eliminating the problems associated with residual catalyst, and other halide-generating mechanisms, in the polymer.

SUMMARY OF THE INVENTION

The present invention provides a solid solution having the formula $Al_2(Mg)_a(OH)_b(CO_3)_c(G)_d \cdot eH_2O$ wherein $3 \leq a \leq 5.5$; $8 \leq b \leq 14$; $1.2 \leq c \leq 3$; $0 \leq d \leq 1$; $1 \leq e \leq 10$ and G is a surface active agent which when incorporated in olefin polymers and copolymers substantially eliminates the adverse corrosion and discoloration of these polymeric materials that otherwise results from the residual halogen catalyst content. The solid solution has a crystallite size in the <003> direction of about 190 Å to about 225 Å, and has bidentate coordination for carbonate ion as shown by an infrared spectrum. Preferably, the surface active agent is a metal salt of a $C_{10}$–$C_{22}$ saturated fatty acid, and more preferably is sodium stearate, zinc stearate or calcium stearate. In a preferred embodiment, the solid solution has the above formula wherein $4.1 \leq a \leq 5.3$; $10 \leq b \leq 12$; $1.3 \leq c \leq 3$; $0.05 \leq d \leq 0.5$; $3 \leq e \leq 9$.

That the solid solution has bidentate coordination for the carbonate ion can be seen by a split absorption band in the region of 1415–1480 cm$^{-1}$. The solid solution preferably has a BET specific surface area of about 25 m²/g to about 40 m²/g. The solid solution may be present in an aqueous slurry, although preferably it is a dry powder. The dry powder has a tap density of about 0.1 g/cc to about 0.3 g/cc. In inhibiting the corrosion-causing tendency and coloration of halogen-containing olefin polymers or copolymers, about 0.01% to about 1% of the solid solution is incorporated into an olefin polymer or copolymer.

The solid solution, having surface active agent, may be formed by a process wherein an aqueous slurry comprising an aluminum compound, preferably basic aluminum carbonate gel and/or aluminum hydroxide, and a magnesium compound, preferably basic hydrated magnesium carbonate and/or magnesium oxide, wherein the molar ratio of magnesium to aluminum is about 1.5 to 2.75, is heated to a temperature of about 70° C. to about 95° C. and for a reaction time "X" to provide a first slurry, where "X" is a period of time sufficient to achieve removal of substantially all free and loosely bound carbon dioxide from the aqueous slurry. Then at least one surface active agent is added to the first slurry, to provide a second slurry. The second slurry is heated to a temperature of about 125° C. to about 140° C. for a time sufficient for a suspension test to be passed. The suspension test is described later herein.

When magnesium oxide is the magnesium compound in the above process, aluminum hydroxide is preferably the aluminum compound, and a stream of carbon dioxide gas is passed through the second slurry at a rate sufficient to produce a solid solution. When basic aluminum carbonate gel is the aluminum compound, it preferably has an $Al_2O_3$ content of about 2% to about 20% by weight. When magnesium carbonate is the magnesium compound, it preferably has a MgO content of about 40% to about 43.5% by weight.

The solid solution prepared as described above is an aqueous slurry and the dry powder is obtainable by removal of water from the second slurry. The resulting solids may be micronized to provide particles having a particle size distribution wherein at least 99% of the particles are less than 44 microns in diameter, and at least 95% of the particles are less than 10 microns in diameter.

The process need not be run in the presence of a surface active agent, in which case an aqueous slurry comprising an aluminum compound, preferably basic aluminum carbonate gel and/or aluminum hydroxide, and a magnesium compound, preferably basic hydrated magnesium carbonate and/or magnesium oxide, wherein the molar ratio of magnesium to aluminum is about 1.5 to 2.75, is heated to a temperature of about 70° C. to about 95° C. and for a reaction time "X" to provide a first slurry. The reaction time "X" is a period of time sufficient to achieve removal of substantially all free and loosely bound carbon dioxide from the aqueous slurry. The first slurry is then heated to a temperature of about 125° C. to about 140° C. for about 1 to about 4 hours.

The solid solutions formed by the above processes preferably have an IR spectrum which displays a split absorption band in the region of 1415–1480 cm$^{-1}$, and preferably have a crystallite size in the <003> direction of about 190 Å to about 225 Å.

BRIEF DESCRIPTION OF THE DRAWING

The foregoing summary, as well as the following detailed description of the preferred embodiments of the invention, will be better understood when read in conjunction with the appended drawing. In the drawing.

DESCRIPTION OF THE PREFERRED EMBODIMENTS

As indicated above, this application is directed to a synthetic solid solution, and in particular to a synthetic basic magnesium aluminocarbonate hydrate which when incorporated into olefin polymers and copolymers inhibits the corrosive and discoloration that results in the polymers from residual halogen catalyst content present in the polymer. The solid solution of the invention has the formula $Al_2(Mg)_a(OH)_b(CO_3)_c(G)_d \cdot eH_2O$ wherein G is at least one surface active agent, and wherein the solid solution displays bidentate coordination for the carbonate ions as shown by an infrared spectrum, and wherein $3 \leq a \leq 5.5$, $8 \leq b \leq 14$, $1.2 \leq c \leq 3$, $0 \leq d \leq 1$ and $1 \leq e \leq 10$. Techniques to determine the compositional formula of hydrotalcite and hydrotalcite-analogues, such as the solid solution set forth above, are well-known in the art.

In a preferred embodiment, the hydrotalcite solid solution particles of the above formula comprise a surface-active agent. However, particularly in instances when the hydrotalcite is intended for use in aqueous coating compositions, or in antacids for pharmaceutical use, the surface active agent may not be present.

Specific examples of the surface active agent include, without limitation, sodium stearate, potassium behenate, sodium montanate, potassium stearate, sodium oleate, potassium oleate, sodium palmitate, potassium palmitate, sodium laurate, potassium laurate, sodium dilaurylbenzenesulfonate, potassium octadecylsulfate, sodium laurylsulfonate, or disodium 2-sulfoethyl α-sulfostearate. Preferably, the surface active agent is a fatty acid salt of a metal, where the fatty acid should have at least about 10 carbon atoms, and may have as many as 20 or more carbon atoms. Fatty acids of greater than about 22 carbon atoms are not readily available at a low cost, and thus the fatty acids employed in the invention preferably have about 10 to about 22 carbon atoms. The fatty acid component is preferably a straight-chain fatty acid, however it may also have branching. The fatty acid component is preferably saturated, so as to be minimally reactive with, e.g., oxygen. A preferred fatty acid is stearic acid, which is a linear, $C_{18}$ fatty acid. A wide range of metal ions may constitute the metal ion component of the fatty acid salt, where exemplary, non-limiting examples of the metal ions include the ions of sodium, calcium, aluminum, magnesium, potassium and zinc. Sodium, zinc and calcium are preferred counterions.

The molar ratio of fatty acid metal salt to aluminum in the solid solution is preferably not more than about 0.5:1. Preferably, the value of "d" in the formula for the solid solutions of the invention is greater than or equal to 0.05. On a weight basis, when the fatty acid salt is sodium stearate, the salt desirably contributes about 5.5 to about 15 weight percent of the solid solution, based on the total weight of the solid solution. When the level of fatty acid salt falls below the stated range, it is observed that the solid solution does not readily mix with polymers or copolymers, and thus is less effective as a halogen-scavenging compound. When the level of fatty acid salt exceeds the stated range, the solid solution does not have improved performance to offset the increased cost of such a formulation.

Figure 1:
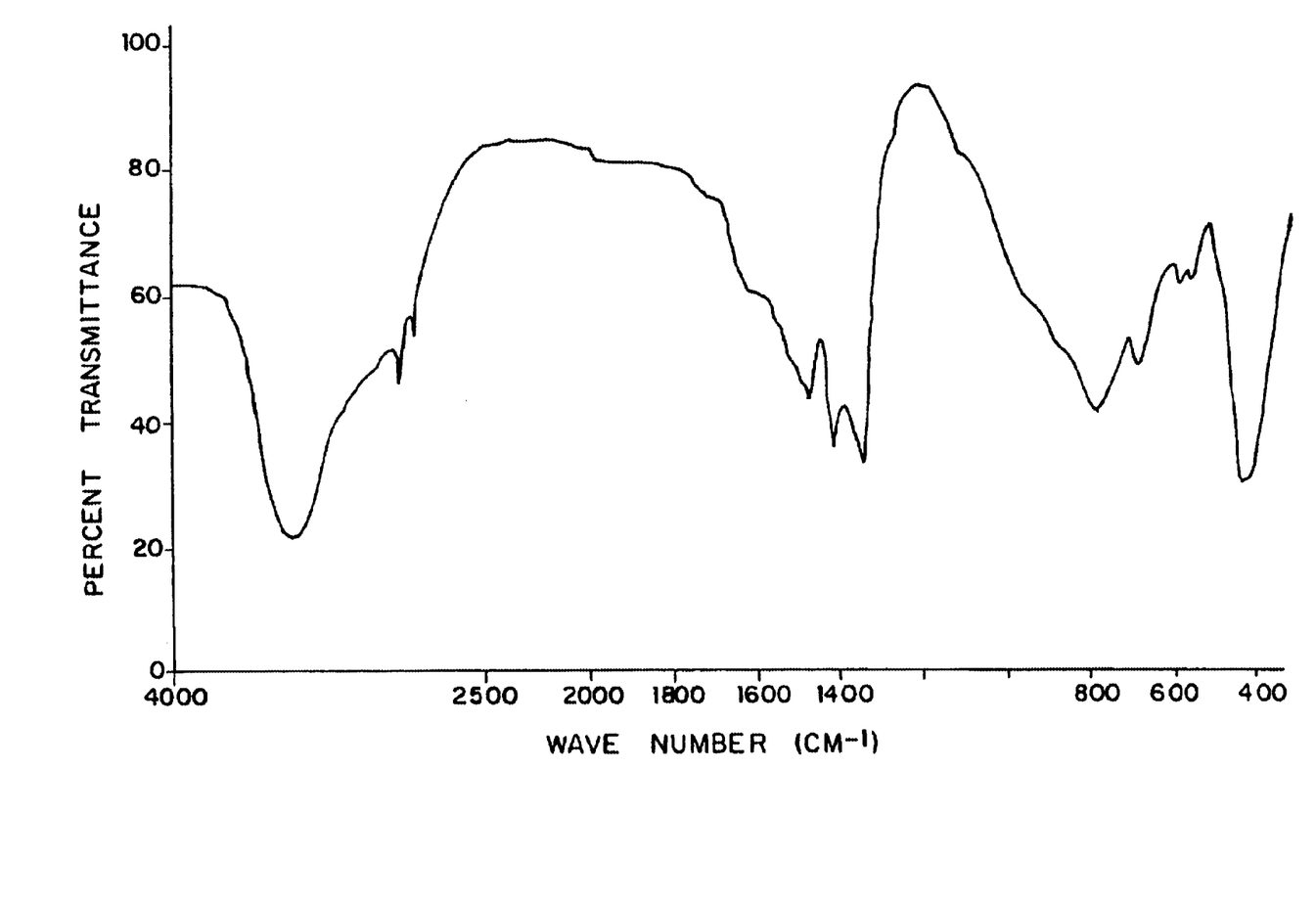
FIG. 1 is an infrared spectrum of a solid solution of the invention.

A typical infrared spectrum of a solid solution of the invention, having sodium stearate as the metal salt, is shown in FIG. 1. Salient features of the spectrum are set forth below in TABLE 1.

TABLE 1

SELECTED ANALYSIS OF IR SPECTRUM IN FIG. 1

| FUNCTIONAL GROUP | FREQUENCY (cm$^{-1}$) |
|---|---|
| —OH Stretching | 3430 |
| H$_2$O (molecular) | 1620 |
| $CO_3^{-2}$ stretching | 1480 / 1415 / 1350 (split) |
| $CO_3^{-2}$ bending | 790 |
| Al—O / Mg—O vibration | 440 |

As seen in FIG. 1, the peak observed in the region of 1415–1480 cm$^{-1}$ is actually split into two peaks. To the best knowledge of the inventors, this feature is unique to solid solutions of the invention, and is indicative of bidentate coordination for the carbonate ions.

The solid solutions of the invention have a crystallite size in the <003> direction, as measured by x-ray diffraction, of about 190 Å to about 225 Å. This is considerably smaller than typical synthetic hydrotalcite-analogues, and is analogous to that found in naturally formed hydrotalcite. Control of the crystallite size in the <003> direction may be achieved by careful control of the manufacturing process, and in particular the conditions of a hydrothermal treatment, as illustrated, for example, in the Examples contained herein.

An X-ray diffraction analysis of a typical solid solution according to the invention is shown in TABLE 2. The X-ray diffraction data indicate that the solid solutions of the invention are distinct from the solid solutions disclosed in, e.g., U.S. Pat. No. 4,539,195, the entire disclosure of which is incorporated herein by reference.

TABLE 2

X-RAY DIFFRACTION ANALYSIS

| INTERPLANAR SPACING (A) | RELATIVE INTENSITY | INTERPLANAR SPACING (A) | RELATIVE INTENSITY |
|---|---|---|---|
| 8.4 | 7 | 2.27 | 7 |
| 7.6 | 100 | 2.15 | 7 |
| 6.3 | 3 | 1.93 | 53 |
| 5.75 | 7 | 1.714 | 10 |
| 4.45 | 2 | 1.619 | 8 |
| 4.18 | 7 | 1.519 | 24 |
| 3.76 | 56 | 1.488 | 22 |
| 2.89 | 10 | 1.450 | 5 |
| 2.84 | 3 | 1.409 | 5 |
| 2.8 | 5 | 1.378 | 2 |
| 2.56 | 61 | 1.306 | 3 |
| 2.52 | 8 | 1.263 | 7 |
| 2.35 | 7 | 1.247 | 5 |

The solid solutions employed in the invention preferably have a tap density of about 0.1 g/cc to about 0.3 g/cc, and more preferably about 0.15 g/cc to about 0.2 g/cc. Tap density may be measured by accurately transferring approximately 10 g of sample into a 250 mL flat-bottomed graduated cylinder, then placing the cylinder in an automatic tapper for one cycle (30 seconds, 1 second drop, 1 second lift, 1 inch drop). The mass of the sample, divided by the volume in the cylinder after one cycle, is the tap density (g/cc). These solutions preferably also have a BET specific surface area of about 25 m$^2$/g to about 40 m$^2$/g. Again, control of the BET surface area is achievable by controlling the manufacturing conditions used to make the solid solution and, in particular by controlling the conditions of the hydrothermal treatment step, as in the Examples presented below.

It is generally observed that precipitation of the solid solution will lead to very high BET specific surface areas, frequently in excess of 100 m$^2$/g. As the temperature and time of a hydrothermal treatment is increased, it is generally observed that a lower BET specific surface area is achieved.

Thermal analysis was performed on a typical solid solution of the invention. The results are shown in TABLE 3.

TABLE 3

THERMAL ANALYSIS

DTA Endotherm (° C.)

| |
|---|
| 265.28 |
| 318.81 |
| 384.08 |
| 429.17 |

The endothermic peak due to elimination of the interlayer of water is observed at 265.28° C., where loss of moisture and carbonate occur. This indicates that there is a high binding force between anions and the basic layer in the solid solution. The second important endotherm occurs at 384.08° C. At this temperature, loss of water of crystallization and carbon dioxide evolution is believed to occur. The final endotherm at 429.17° C. is due to decomposition of brucite-like layers in the solid solution.

A solid solution of the kind employed by the invention is obtainable by:(a) heating an aqueous slurry comprising an aluminum compound such as basic aluminum carbonate gel and/or aluminum hydroxide, and a magnesium compound such as basic hydrated magnesium carbonate and/or magnesium oxide, wherein the molar ratio of magnesium to aluminum is about 1.5 to 2.75, to a temperature of about 70° C. to about 95° C. for as long as necessary to remove all free or loosely bound carbon dioxide, which is typically at least about 1 hour, to form a first slurry; (b) adding at a surface active agent to said first slurry, to provide a second slurry; and (c) heating said second slurry to a temperature of about 125° C. to about 140° C. for a time sufficient for a suspension test (described below) to be passed.

The aluminum hydroxide employed is preferably an active aluminum hydroxide, particularly a finely particulate, amorphous aluminum hydroxide gel which quickly dissolves in diluted acid. Such an aluminum hydroxide can be produced, for example, by precipitation from aluminum salt solutions by means of bases, particularly alkali carbonates. The magnesium compounds employed in the process of the present invention should likewise be present in their active form. Dead-burnt MgO, for example, is entirely unsuitable. The production of active magnesium oxides (hydratable) and basic magnesium carbonates is known. The basic aluminum carbonate preferably has an Al$_2$O$_3$ content of about 2% to about 20%, and the magnesium compound is preferably a basic hydrated magnesium carbonate having a MgO content of about 40% to about 43.5%.

The aqueous slurry should be heated for a time and temperature sufficient to liberate most if not all of the free or loosely bound carbon dioxide from the aqueous slurry. This point can be determined based on the procedure provided in the General Procedures description below typically, by heating the slurry for at least one hour and preferably about 1.5 to about 2.5 hours, at a temperature of about 70° C. to about 95° C., preferably about 85° C. to about 90° C.

The second slurry, which contains a surface active agent, should be heated for a time and temperature such that the solid solution contained therein passes the suspension test as described in the General Procedures description section below. Typically, this can be accomplished by heating for about 1.5 to about 4 hours, preferably for about 1.5 to about 2 hours, at a temperature of about 125° C. to about 140° C., preferably about 130° C. to about 135° C.

When magnesium oxide is used as the magnesium compound, and aluminum hydroxide is the aluminum compound, carbonate ion should be provided to the reaction mixture, and this can be accomplished by passing a stream of carbon dioxide gas through the second slurry at a rate sufficient to produce the solid solution.

If the solid solution is made free of surface active agent, it will not pass the suspension test unless a hydrothermal treatment is applied for about 1 to about 4 hours, at a temperature of about 125° C. to about 140° C.

In inhibiting the corrosion-causing tendency of halogen-containing olefin polymers or copolymers according to the invention about 0.01% to about 1% of the solid solution hereinabove describes is incorporated into an olefin polymer or copolymer composition.

The solid solution may be compounded with synthetic resins containing halogens and/or acidic substances derived from, for example, catalysts, monomers and post-treating agents. Examples of such synthetic resins include synthetic resins produced by using halogen-containing Ziegler-type catalysts, such as low-density to high-density polyethylenes, polypropylene, polybutene-1, poly(4-methylpentene-1), ethylene/propylene copolymer, ethylene/propylene/polyene copolymers, ethylene/butene-1 copolymer, polybutadiene rubber and polyisoprene rubber.

Further exemplary synthetic resins, which may be produced using halogen-containing Friedel-Crafts catalysts, include, without limitation, polybutene, polyacetal, butyl rubber, liquid polyisobutylene, petroleum resins and polybenzil. Synthetic resins produced using acidic substances such as sulfuric acid, phosphoric acid and hydrochloric acid as catalysts, may also be employed, and include such resins as diallyl phthalate resin, phenolic resins, xylene resin and silicone resins.

Synthetic resins derived from monomers containing halogens and/or acidic substances may also benefit from compounding with a solid solution of the invention. Exemplary polymers polyvinyl chloride, copolymers of vinyl chloride with at least one comonomer selected from olefinic monomers such as ethylene and propylene, vinylidene halide monomers such as vinylidene chloride and vinylidene fluoride, vinyl acetate, vinyl ether monomers such as lauryl vinyl ether, maleic anhydride, maleic acid esters such as butyl maleate, butadiene and styrene, polyvinylidene chloride, vinylidene chloride copolymers, polyvinyl acetate, vinyl acetate copolymers, polyorganosiloxanes, acrylic or methacrylic polymers or copolymers, epoxy chloroprenne rubber, fluorine rubber, polycarbonate resins, polyesters such as polyethylene terephthalate or polybutylene terephthalate, and polyurethane resins.

The polymers and copolymers may be post-halogenated synthetic resins such as post-chlorinated olefinic resins (e.g., chlorinated polyethylene) post-chlorinated vinyl chloride-type resins (e.g. chlorinated polyvinyl chloride), post-chlorosulfonated olefinic resins (e.g. chlorosulfonated polyethylene) and post-halogenated rubbers such as (e.g., chlorinated or brominated butyl rubber); synthetic resins subjected to post-treatments (such as washing with acids), such as sulfuric acid, phosphoric acid or hydrochloric acid, or neutralization, for example ABS resin and polystyrene resin; synthetic resins containing halogen-containing fire retardants or flame retardants such as tetrabromobisphenol A, decarbromodiphenyl oxide, or chlorinated paraffin; synthetic resins containing halogen-containing coloring agents or phenolic antioxidants such as isoindolinone or phthalocyanine green.

There is no particular restriction on the means of blending the synthetic resin with the hydrotalcite solid solution of the invention. For example, the synthetic resin and solid solution may be mixed as uniformly as possible with or without resin additives by the same means as conventionally used to mix resins with, for example, stabilizers fillers. Mixing may be carried out by using known mixing devices such as a ribbon blender, a high-speed mixer, a kneader, a pelletizer or an extruder. Alternatively, it is possible to use a method by which a suspension of the solid solution is added to a resin slurry immediately after polymerization, and the mixture is stirred and then dried.

The following examples are set forth as a means of illustrating the present invention and are not to be construed as a limitation thereon.

General Procedures
Loose or Free Carbon Dioxide Determination

According to the method, a sample is placed under vacuum such that free or loosely absorbed carbon dioxide is removed from the sample and captured in a bed of ascarite. The weight gain of the ascarite is proportional to the carbon dioxide level in the sample.

Procedure:

A single-necked flask is fitted with an adapter, which is connected through tubing to a bubbler containing conc. sulfuric acid. The bubbler exit is connected with tubing to a series of three, glass u-tubes which are connected in tandem by tubing. The u-tubes have stopcocks at each end, which allow control of the gas flow through the u-tubes. The last u-tube is connected to a vacuum source. The u-tube closest to the bubbler is filled with magnesium perchlorate ($Mg(ClO_3)_2$), the middle u-tube contains a plug of ascarite (mesh size 8–20) followed by a plug of magnesium perchlorate, and the third u-tube (closest to the vacuum source) contains a plug of magnesium chlorate followed by a plug of ascarite (20–30 mesh size).

Pinch clamps are placed on the pieces of tubing which flank the middle u-tube. Both stopcocks of the middle u-tube are closed, then the middle u-tube is disconnected from the tubing and weighed. The middle u-tube is replaced and the pinch clamps removed. All stopcocks are opened.

About 1 to 2 grams of sample are accurately weighed into the single-necked flask. Then a slight vacuum is applied until about 3 bubbles/second come through the bubbler. The flask containing the sample is heated for about 10 minutes, then the heat is removed and the flask allowed to cool under vacuum for about 15 minutes. The vacuum is discontinued and the middle u-tube is reweighed as before. If the weight gain is not more than about 0.6 g, then substantially all of the free or loosely bound carbon dioxide has been removed from the solid solution.

Suspension Test

Combine 100 mL deionized water and about 0.5–0.6 g of solid solution, as a dry powder, into a 150 mL beaker. Add a magnetic bar and stir the suspension vigorously for five minutes. Allow the suspension to stand for five minutes. The absence of any settling of the powder indicates that additional thermal treatment is not necessary.

In the Examples, average particle size was determined using a Microtrac SRA 50 particle measurement system from Leeds & Northrop Co., Palm Harbor, Fla. BET surface area was measured using a Monosorb surface area analyzer from Quanta Chrome Corporation, Syosset, N.Y.

Homogenization of the slurry was done using a Manton-Gaulin Homogenizer Model 15M from Gaulin Corporation, Everett Mass., operated at 5000 psi. Homogenization pressures of about 3000 psi to about 8000 psi were found to be satisfactory, and a preferred pressure was about 5000–6000 psi.

PREPARATIVE EXAMPLES

Example 1

A slurry was prepared by blending 346 g basic aluminum carbonate gel (12.9% $Al_2O_3$, LIQUIGEL HO, Reheis Inc., Berkeley Heights, N.J.), 186 g USP grade heavy $MgCO_3$ powder (Whittaker, Clark & Daniels, South Plainfield, N.J.) and 649 g water. The slurry was maintained at 85° C. for 0.5 hour; then maintained at 70° C. for 1 hour. To the slurry was added 18.5 g sodium stearate (Sodium Stearate EA, Food Grade, Witco Corporation, Oakland, N.J.). The slurry was transferred to a Parr bomb (Series 4500 Pressure Reactor, Parr Instrument Company, Moline, Ill.), where it was heated at 145° C. for 4 hours. The resulting slurry was processed through a spray dryer (Bowen Engineering Inc., Bridgewater, N.J.) at an outlet temperature of 75° C. to produce a fine, white powder which was then micronized in an air mill to an average particle size of 1.4 microns.

The product was analyzed to have 14.9% $Al_2O_3$, 29.8% MgO, 16.4% $CO_2$, and 7.04% sodium stearate for a formula of $$Al_{2.0}(Mg)_{5.1}(OH)_{11.1}(CO_3)_{2.55}(Na\ Stearate)_{0.16} \cdot 6.69(H_2O).$$

The powder had a BET surface area of 25.0 $m^2/g$, a tap density of 0.16 g/cc, and a $Al/CO_3$ molar ratio of 0.78.

Example 2

Following the procedure of Example 1, a slurry was prepared blending 326 g of basic aluminum carbonate gel (13.8% $Al_2O_3$), 186 g USP grade heavy $MgCO_3$ powder and 669 g water. The resultant slurry was maintained at 85° C. for 0.5 hour; then maintained at 70° C. for 1 hour. To the slurry was added 18.5 g sodium stearate. The slurry was transferred to a Parr bomb, where it was heated at 130° C. for 4 hours.

The product was removed from the Parr bomb and homogenized to break down any agglomerates formed during the processing step into fine submicron- and micron-size particles. The primary precipitated particles are in the submicron range, and agglomerate during the processing steps. The homogenized sample was then processed through a spray dryer at an outlet temperature of 75° C. to produce a fine, white powder which was then micronized in an air mill to an average particle size of 1.4 microns.

The product was analyzed to have 14.1% $Al_2O_3$, 29.4% MgO and 16.4% $CO_2$. The powder had a BET surface area of 24.8 $m^2/g$ and a tap density of 0.24 g/cc.

Example 3

Following the procedure of Example 1, a slurry was prepared by blending 326 g basic aluminum carbonate gel (13.8% $Al_2O_3$), 186 g USP grade heavy $MgCO_3$ powder and 669 g water. The resultant slurry was maintained at 85° C. for 0.5 hour; then maintained at 70° C. for 1 hour. To the slurry was added 18.5 g sodium stearate, and the mixture was homogenized to break down any agglomerates formed during the prior processing steps, into fine submicron- and micron-size particles. The slurry was then transferred to a Parr bomb and heated at 130° C. for 4 hours and processed through a spray dryer at an outlet temperature of 75° C. to produce a fine, white powder which was then micronized in an air mill to an average particle size of 1.7 microns.

The product was analyzed to have 17.0% $Al_2O_3$, 30.0% MgO and 11.5% $CO_2$. The powder had a BET surface area of 23.1 $m^2/g$, a tap density of 0.17 g/cc, and a crystallite size according to x-ray diffraction in the <003> direction of 225 Å.

Example 4

Following the procedure of Example 1, a slurry was prepared by blending 348 g basic aluminum carbonate gel (12.9% $Al_2O_3$), 186 g USP grade heavy $MgCO_3$ powder and 649 g water. The resultant slurry was maintained at 85° C. for 0.5 hour; then maintained at 70° C. for 1 hour. To the slurry was added 18.5 g of sodium stearate. The slurry was transferred to a Parr bomb and heated at 130° C. for 4 hours and then processed through a spray dryer at an outlet temperature of 75° C. to produce a fine, white powder which was then micronized in an air mill to an average particle size of 2.9 microns.

The product was analyzed to have 14.4% $Al_2O_3$, 29.3% MgO, 18% $CO_2$ and 5.39% sodium stearate for a formula of $$Al_{2.0}(Mg)_{5.21}(OH)_{10.57}(CO_3)_{2.93}(Na\ Stearate)_{0.13} \cdot 7.86H_2O.$$

The powder had a BET surface area of 27.2 $m^2/g$, and a tap density of 0.23 g/cc. The ratio of Al to $CO_3$ was 0.68.

Example 5

Following the procedure of Example 1, a slurry was prepared by blending 344 g basic aluminum carbonate gel, 186 g USP grade heavy $MgCO_3$ powder and 649 g water. The resultant slurry was maintained at 85° C. for 0.5 hour; then maintained at 70° C. for 1 hour. To the slurry was added 18.5 g of sodium stearate. The slurry was transferred to a Parr bomb and heated at 130° C. for 4 hours and then processed through a spray dryer at an outlet temperature of 75° C. to produce a fine, white powder and micronized in an air mill to an average particle size of 2.1 microns.

The product was analyzed to have 13.6% $Al_2O_3$ and 30.4% MgO. The powder had a BET surface area of 24.1 $m^2/g$ and a tap density of 0.19 g/cc.

Example 6

Following the procedure of Example 1, a slurry was prepared by blending 360 lbs basic aluminum carbonate gel (9.0% $Al_2O_3$, LIQUIGEL NA, Reheis, Inc., Berkeley Heights, N.J.), 108 lbs USP grade heavy $MgCO_3$ powder and 600 lbs water in a pilot plant facility having a glass-lined reactor. The resultant slurry was maintained at 80–85° C. for 2.5 hours. To the slurry was added 14 lbs of zinc stearate, and the slurry heated at 135° C. for 1.5 hours. The resulting slurry was processed through a spray dryer at an inlet temperature 135–163° C. and outlet temperature of 70–75° C. to produce a fine, white powder which was then micronized in an air mill to an average particle size of 3.2 microns.

The product was analyzed to have 16.7% $Al_2O_3$, 29.0% MgO, 10.0% $CO_2$, and 9.67% zinc stearate for a formula of $$Al_{2.0}(Mg)_{4.36}(OH)_{11.94}(CO_3)_{1.39}(Zn\ Stearate)_{0.09} \cdot 5.76H_2O.$$

The powder had a BET surface area of 29.7 $m^2/g$ and, according to x-ray diffraction, a crystallite size in the <003> direction of 205 Å. The powder had a tap density of 0.21 g/cc.

Example 7

Following the procedure of Example 1, a slurry was prepared by blending 242 lbs basic aluminum carbonate gel (9% $Al_2O_3$), 72 lbs USP grade heavy $MgCO_3$ powder and 450 lbs water. The resultant slurry was maintained at 80–85° C. for 1.5 hours, then 11.3 lbs calcium stearate was added followed by additional heating at 132° C. for 1.5 hours. The resulting slurry was processed through a spray dryer at an outlet temperature of 70–75° C. to produce a fine, white powder which was then micronized in an air mill to an average particle size of 3.6 microns.

The product was analyzed to have 17% $Al_2O_3$, 30.3% MgO, 11.8.% $CO_2$, and 8.72% calcium stearate for a formula of $$Al_{2.0}(Mg)_{4.54}(OH)_{11.82}(CO_3)_{1.64}(Ca\ Stearate)_{0.085} \cdot 5.03H_2O.$$

The powder had a BET surface area of 29.7 $m^2/g$ and, according to x-ray diffraction, a crystallite size in the <003> direction of 201 Å. The powder had a tap density of 0.23 g/cc.

Example 8

Following the procedure of Example 1, a slurry was prepared by blending 270 lbs basic aluminum carbonate gel (8.86% $Al_2O_3$), 42.5 lbs basic aluminum carbonate gel (13.4% $Al_2O_3$), 134 lbs USP grade heavy $MgCO_3$ powder and 500 lbs water. The resultant slurry was maintained at 80–85° C. for 1.5 hours, then 14.3 lbs sodium stearate were added followed by heating at 135° C. for 1.5 hours and then processed through a spray dryer at an outlet temperature of 55–60° C. to produce a fine, white powder that was micronized in an air mill to an average particle size of 2.6 microns.

The product was analyzed to have 17.8% $Al_2O_3$, 30.2% MgO, 10.9% $CO_2$, and 7.4% sodium stearate for a formula of $$Al_{2.0}(Mg)_{4.29}(OH)_{11.71}(CO_3)_{1.43}(Na\ Stearate)_{0.14} \cdot 4.91H_2O.$$

The powder had a BET specific surface area of 30.5 $m^2/g$ and, according to x-ray diffraction, a crystallite size in the <003> direction of 190 Å. The powder had a tap density of 0.12 g/cc.

PERFORMANCE EXAMPLES

Example 9 and Comparative Example 1

A masterbatch containing 1% additive package and 99% HDPE (unstabilized reactor high density polyethylene, product 8412, Chevron Chemical, Orange, Tex.) was prepared by dry blending. The chloride concentration of the HDPE was determined to be 360 ppm (one determination). The additives were 1000 ppm of a primary antioxidant (Irganox 1010, Batch No. 391204, Ciba-Geigy, Suffern, N.Y.), 500 ppm of a secondary antioxidant (Irgafos 168, Batch No. AVA 382001, Ciba-Geigy), and 300 ppm of solid solution prepared according to Example 8. The masterbatch was extruded and formed into discs as described below, to prepare Sample No. 9.

A comparison composition was prepared as follows. The composition of Example 9 was duplicated, with the exception that DHT-4A (a hydrotalcite from Kyowa Chemical Industry Co., Ltd., Tokyo, Japan) was substituted for the solid solution of Example 8. The masterbatch was extruded and formed into discs as described below, to prepare Sample No. C1.

Extrusion Conditions:

Sample Nos. 9 and C1 were first extruded through a Leistritz 34 mm co-rotating, intermeshing twin-screw 10-zone extruder, with an L/D of 40. Two volumetric feeders were used to feed the materials at about 20 lb/hr. The ratio of feed rates of each feeder was adjusted so that the additives were fed at the prescribed concentrations. Before starting, the extruder was purged with purging compound, followed by polypropylene and then 12 lb of each polymer-based formulation. Vacuum was not used. Each material was extruded through a strand die and quenched in cold water. High velocity air was used to blow off water from the extruder strand, after which it was pelletized in a Killion Pelletizer.

Each of the two formulations was then extruded four additional times in a Killion 1" single screw 5-zone extruder, with an L/D of 20 and a general purpose screw. Between each run about 1 lb. of formulated material was used to purge the machine. The extruded material was quenched and pelletized as described above.

TABLE A reports the extrusion conditions for each of the five runs.

TABLE A

EXTRUSION CONDITIONS

| Pass No. | Sample Number | Extruder Used | Zone Temperature (° C.) | | | | | | | | | | Die Pressure (PSI) | Screw Speed (RPM) | Melt Temp. (° C.) | Torque (amp) |
|---|---|---|---|---|---|---|---|---|---|---|---|---|---|---|---|---|
| | | | 1 | 2 | 3 | 4 | 5 | 6 | 7 | 8 | 9 | 10 | | | | |
| 1 | C1 | Leistritz | 128 | 170 | 200 | 200 | 200 | 198 | 201 | 200 | 199 | 198 | 360 | 100 | NM | 21.5 |
| 1 | 9 | Leistritz | 125 | 170 | 200 | 200 | 200 | 200 | 200 | 200 | 200 | 198 | 360 | 100 | NM | 21.0 |
| 2 | C1 | Killion | 92 | 148 | 197 | 201 | 199 | | | | | | 2000 | 115 | 223 | 8.0 |
| 2 | 9 | Killion | 100 | 149 | 201 | 201 | 201 | | | | | | 1950 | 115 | 224 | 6.0 |
| 3 | C1 | Killion | 96 | 140 | 201 | 201 | 198 | | | | | | 1950 | 115 | 221 | 7.5 |
| 3 | 9 | Killion | 93 | 140 | 200 | 201 | 199 | | | | | | 1950 | 115 | 223 | 6.5 |
| 4 | C1 | Killion | 94 | 148 | 198 | 200 | 199 | | | | | | 1950 | 115 | 223 | 7.0 |
| 4 | 9 | Killion | 94 | 148 | 198 | 199 | 199 | | | | | | 1950 | 115 | 225 | 6.5 |
| 5 | C1 | Killion | 94 | 148 | 202 | 202 | 201 | | | | | | 1950 | 115 | 222 | 6.0 |
| 5 | 9 | Killion | 94 | 149 | 200 | 201 | 199 | | | | | | 1950 | 115 | 225 | 6.5 |

Sample Preparation:

Discs, 1/8" thick and 3.1" in diameter, were prepared from the extruded material by compression molding. The HDPE samples were prepared at 175° C. as follows: 1 min preheating pellets, 2 min melting at 1000 lbs, 3 min cooling at 5000 lbs.

Testing:

Color data for the discs prepared above was obtained using the combination of a Macbeth Color Eye® spectrophotometer Model M2090 PL and an IBM personal computer. Color measurement was done in a reflectance mode. From reflectance data, the tristimulus values were computed to generate yellow-blue ("Blue" in TABLE B) and red-green ("Green" in TABLE B) indices. Oven-aging conditions were 110° C. for 22 hrs. The color data appears in TABLE B.

TABLE B

Color Data

| Pass No. | Sample No. | Blue | Green | Halogen-scavenger |
|---|---|---|---|---|
| 1 | C1 | 5.37 | 7.21 | DHT-4A |
| 1 | 9 | 5.78 | 7.66 | Ex. No. 8 |
| 1 | C1 (Aged) | 5.10 | 7.15 | DHT-4A |
| 1 | 9 (Aged) | 5.64 | 7.66 | Ex. No. 8 |
| 3 | C1 | 4.47 | 6.45 | DHT-4A |
| 3 | 9 | 5.38 | 7.36 | Ex. No. 8 |
| 5 | C1 | 3.96 | 6.06 | DHT-4A |
| 5 | 9 | 5.95 | 7.18 | Ex. No. 8 |

The data in Table B indicates that the solid solution from Example No. 8 is a superior halogen-scavenger: the color of Sample No. 9 was more consistent throughout five extrusion passes, and was slightly whiter in color than Sample No. C1.

Yellowness Index:

Yellowness index (ASTM D-1925) was also measured on discs molded after one, three, and five passes, and oven-aged discs produced after one pass. Oven-aging conditions were 110° C. for 22 hrs. Average results for two discs are shown in TABLE C. Two measurements per each side of each of the discs were made. The results indicate that, in HDPE, the solid solution prepared in Example No. 8 yields a less yellow polymer composition, after 5 passes through an extruder, than is achieved using DHT-4A under the same conditions.

TABLE C

YELLOWNESS INDEX OF HDPE FORMULATIONS

| Pass No. | Sample No. | Color Index | Pass No. | Sample No. | Color Index |
|---|---|---|---|---|---|
| 1 | 9 | 9.20 | 1 | C1 | 8.73 |
| 1 | 9 (Aged) | 9.94 | 1 | C1 (Aged) | 9.71 |
| 3 | 9 | 10.7 | 3 | C1 | 12.1 |
| 5 | 9 | 11.7 | 5 | C1 | 13.4 |

Example 10 and Comparative Example 2

A masterbatch containing 1% additive package and 99% unstabilized polypropylene (PP) (Fortilene PP 9600, Solvay, Deer Park, Tex.) was prepared by dry blending. The additives were 1000 ppm of a primary antioxidant (Irganox 1010, Ciba-Geigy, Batch #391204), 500 ppm of a secondary antioxidant (Sandostab P-EPQ), and 300 ppm of solid solution prepared according to Example 8.

The masterbatch was initially extruded through a W&P ZSK30 co-rotating intermeshing twin screw extruder with an L/D of 40. The extrudate was then extruded four times through a Killion 1" single-screw extruder with an L/D of 20. Discs, denoted Sample No. 10, and each having a 0.077 inch thickness, were prepared by compression molding at 195° C. as follows: 2 min. pre-heating of pellets, 2 min. melting at 5,000 lbs, and 3 min. cooling at 5.000 lbs.

To prepare Comparative Example 2, the composition of Example 10 was duplicated, with the exception that DHT-4A was substituted for the solid solution of Example 8. The masterbatch was extruded, and discs prepared, as described above, to prepare Sample No. C2.

The Yellowness Index according to ASTM D-1925 was determined for Samples Nos. 10 and C2 as shown in TABLE D. Results indicate superior performance for Sample No. 10.

TABLE D

YELLOWNESS INDEX OF PP FORMULATIONS

| Pass No. | Sample No. | Color Index | Pass No. | Sample No. | Color Index |
|---|---|---|---|---|---|
| 1 | 10 | 6.4 | 1 | C2 | 8.2 |
| 1 | 10 (Aged) | 6.2 | 1 | C2 (Aged) | 6.5 |
| 3 | 10 | 11.2 | 3 | C2 | 14.5 |
| 5 | 10 | 130.0 | 5 | C2 | 16.1 |

Example 11

Corrosion Test

The corrosion inhibition performance of the halogen scavenger of the invention was measured using the following procedure. Compounded formulations of minimally stabilized polymer and halogen scavenger, as set forth in Table F, were placed between polished (15 cm×10 cm) steel plates. Three weighted plates, total weight 350 g, were placed on the sample test plates and the assembly was placed in a circulating air oven at 250° C., where it was heated for thirty minutes. The assembly was removed and, being careful not to touch the test surface of the test plate, it was stripped away from the resin sample. The test plate was allowed to stand in a humidity saturated chamber at 250° C. for 12 hours. No part of the test plate actually touched water while in the humidity chamber.

The corrosivity of the polymer was classified as none, slight, medium, high, or very high according to the appearances set forth in TABLE E.

TABLE E

| Corrosivity Classification | Plate Appearance |
|---|---|
| None | Glossy surface or no rust removed when wiped with a clean white paper towel. |
| Slight | Some small rust spots or slight streaking. The rust may be apparent only when wiped with a clean white towel. (The rust will appear very lightly on the towel.) |

TABLE E-continued

| Corrosivity Classification | Plate Appearance |
|---|---|
| Medium | One or more clear rust spots. (These spots are clearly visible and wiping is not necessary.) |
| High | All of the surface is covered with clear rust spots. |
| Very High | The rust is present over essentially the entire test area of the test plate. |

In TABLE F, "Ex. No. 6" refers to the solid solution prepared according to the procedure provided in Example No. 6, above. "Ex. No. 8" and "Ex. No. 3" have the corresponding meanings. This table lists corrosion tests that were run with virgin linear low density polyethylen supplied by Chevron and a propylene Fortilene supplied by Solvay. As seen, the corrosion results clearly show, there occurs substantial submittal corrosion when the synthetic halogen scavenger additive is omitted while the presence of the synthetic additive eliminates or greatly reduces corrosion.

TABLE F

CORROSION TEST RESULTS

| Polymer Tested | Halogen scavenger Tested | Concentration ppm | Corrosion Test Results |
|---|---|---|---|
| Virgin linear low density PE Lot #ER 3003Z (Chevron) | None Ex. No. 6 Ex. No. 8 Ex. No. 3 | 0 500 500 500 | High None slight slight |
| Polypropylene Fortilene Lot #9600 (Solvay) | None Ex. No. 6 Ex. No. 8 Ex. No. 3 | 0 500 500 500 | Medium None None None |

The results of further experimentation using the halogen scavenger system of the invention is presented by the following additional Examples. The tests were run at the Solvay Polymers Technical Center in Deer Park, Tex. The results obtained demonstrate that the use of the halogen scavenger of the invention definitely yields improved anti-corrosion results.

1) The first study was conducted in December, 1991. The Solvay reference number is BJB-91-34. Three levels of Synthetic Halogen Scavenger* (300 ppm, 600 pp, 900 ppm) were compounded into a common polypropylene flake (F032K04) with each containing 200 ppm Irganox B-225 as the antioxidant system. The standard acid scavenger tested at the same concentrations and extrusion conditions was calcium stearate. Extrusion conditions were held stable throughout the trial, and nitrogen was introduced at the barrel port to reduce oxidation. The feed rate was adjusted on each sample to maitain the extruder torque at 88%. The extruder pressure was within the acceptable range of 250–315 psi. The corrosivity was determined by contacting a molded polymer plaque with an iron plate in a humid environment and measuring the weight of oxidized iron adhering to the exposed plate. The maxium acceptable corrosion score is 4.0 mg. The corrosion data after a single extruder pass is summarized below.

|   | Acid Neutralizer | Concentration (ppm) | Corrosion (mg) |
|---|---|---|---|
| 1 | Calcium Stearate | 300 | 3.5 |
| 2 | Calcium Stearate | 600 | 0.4 |
| 3 | Calcium Stearate | 900 | 2.3 |
| 4 | Synthetic Halogen Scavenger* | 300 | 2.3 |
| 5 | Synthetic Halogen Scavenger* | 600 | 1.1 |
| 6 | Synthetic Halogen Scavenger* | 900 | 1.0 |
| 7 | Calcium Stearate | 300 | 2.3 |
| 8 | Calcium Stearate | 600 | 2.3 |
| 9 | Calcium Stearate | 900 | 2.5 |

*Prepared using the process of the invention.

Overall, Synthetic Halogen Scavenger* provided noticeably better corrosion protection than calcium stearate.

2) The second study was conducted in June, 1992. The Solvay reference number is BJB-92-29. Three levels of Synthetic Halogen Scavenger* (150 ppm, 300 ppm, 450 ppm) were compounded into the indentical Fortilene polyproplene resin formulation (1000 ppm Ethanox 330, 500 ppm Irgafos PEPQ, 500 ppm Irganox 1076, 300 ppm glycerine) and extruded under similar process conditions as the previous study. The corrosivity potential was also determined in the same manner as the previopus study. The corrosion data after both the first and fifth extrusion passes is summarized below.

|   | Synthetic Halogen Scavenger* Concentration (ppm) | Corrosion (mg) | |
|---|---|---|---|
|   |   | Pass 1 | Pass 2 |
| 1 | 150 | 3.7 | 1.0 |
| 2 | 300 | 2.5 | 0.1 |
| 3 | 450 | 0.2 | 1.4 |
| 4 | 300 | 3.1 | 1.6 |
| 5 | 300 | 2.8 | 2.6 |

Synthesis Halogen Scavenger* provided corrosion protection below the maximum acceptable score. The protection afforded after multiple extrusions is particularly important, as polymers are often reground and reprocessed.

It will be appreciated by those skilled in the art that various changes could be made to the embodiments described above without departing from the concept of the invention thereof. It is understood, also, that the invention is not limited to the particular embodiments disclosed, and that various modifications may be made within the spirit and scope of the present invention as defined by the appended claims.

What is claimed is:

1. A method for inhibiting the corrosion-causing tendency and coloration of halogen-containing olefin polymers and copolymers, comprising incorporating about 0.01% to about 1% of a solid solution having the formula $Al_2(Mg)_a(OH)_b(CO_3)_c(G)_d \cdot eH_2O$ and a crystallite size in the <003> direction of about 190 Å to about 225 Å, and having bidentate coordination for carbonate ion as shown by an infrared spectrum, and wherein $3 \leq a \leq 5.5$; $8 \leq b \leq 14$; $1.2 \leq c \leq 3$; $0 \leq d \leq 1$; $1 \leq e \leq 10$ and G is a surface active agent into an olefin polymer or copolymer.

2. The method according to claim 1, wherein G of the solid solutions is a metal salt of a $C_{10}$–$C_{22}$ saturated fatty acid.

3. The method according to claim 2, wherein said metal salt of a $C_{10}$–$C_{22}$ saturated fatty acid is selected from the group consisting of the sodium stearate, zinc stearate and calcium stearate.

4. The method according to claim 1 wherein the solid solution has having an infrared spectrum that displays a split absorption band in the region of 1415–1480 $cm^{-1}$.

5. The method according to claim 1 wherein the solid solution has a tap density of about 0.1 g/cc to about 0.3 g/cc.

6. The method according to claim 1 wherein the solution sold has a BET specific surface area of about 25 $m^2/g$ to about 40 $m^2/g$.

7. A solid solution for inhibiting the corrosion-causing tendency and coloration of halogen-containing olefin polymers or copolymers formed by a process comprising the steps:

(a) heating an aqueous slurry comprising an aluminum compound selected from the group consisting of basic aluminum carbonate gel and aluminum hydroxide, and a magnesium compound selected from the group consisting of basic hydrated magnesium carbonate and magnesium oxide, wherein the molar ratio of magnesium to aluminum is about 1.5 to 2.75, to a temperature of about 70° C. to about 95° C. and for a reaction time "X" to provide a first slurry, where "X" is a period of time sufficient to achieve removal of substantially all free and loosely bound carbon dioxide from the aqueous slurry;

(b) adding at least one surface active agent to said first slurry, to provide a second slurry;

(c) heating said second slurry to a temperature of about 125° C. to about 140° C. for a time sufficient for a suspension test to be passed, where the suspension test takes an aliquot of said second slurry, removes the water therefrom to provide about 0.5 to about 0.6 g of dry solid solution in powdered form, combines the dry solid solution with about 100 mL deionized water to provide a suspension, and stirs the suspension vigorously for about five minutes, where the failure of the suspension to exhibit appreciable settling after stirring is completed indicates that the suspension test has been passed.

8. A solid solution according to claim 7 having an infrared spectrum that displays a split absorption band in the region of 1415–1480 $cm^{-1}$.

9. A solid solution according to claim 7 having a crystallite size in the <003> direction of about 190 Å to about 225 Å.

10. A solid solution according to claim 7 having a BET specific surface area of about 25 $m^2/g$ to about 40 $m^2/g$.

11. A solid solution according to claim 7, wherein magnesium oxide is the magnesium compound, aluminum hydroxide is the aluminum compound, and a stream of carbon dioxide gas is passed through the second slurry at a rate sufficient to produce the solid solution.

12. A solid solution according to claim 7, wherein said surface active agent is a metal salt of a $C_{10}$–$C_{22}$ saturated fatty acid.

13. A solid solution according to claim 7, wherein said surface active agent is selected from the group consisting of the sodium stearate, zinc stearate and calcium stearate.

14. A solid solution according to claim 7, wherein the basic aluminum carbonate gel has an $Al_2O_3$ content of about 2% to about 20% by weight.

15. A solid solution according to claim 7, wherein said magnesium carbonate has a MgO content of about 40% to about 43.5% by weight.

16. A solid solution according to claim 7, wherein said aqueous slurry is heated for about an hour at a temperature of about 85° C. to about 90° C. for about 1.5 hours to about 2 hours.

17. A solid solution according to claim 7, further comprising the step of removing the water from said second slurry to provide a dry solid solution, and then micronizing said dry solid solution to provide particles having a particle size distribution wherein at least 99% of the particles are less than 44 microns in diameter, and at least 95% of the particles are less than 10 microns in diameter.

18. A solid solution according to claim 17, wherein the average particle size of the dry solid solution is about 4 microns to about 5 microns and a tap density of about 0.1 g/cc to about 0.3 g/cc for inhibiting the corrosion-causing tendency and coloration of halogen containing olefin polymer and copolymers.

19. A solid solution for inhibiting the corrosion-causing tendency and coloration of halogen containing olefin polymers and copolymers formed by a process comprising the steps of:

(a) heating an aqueous slurry comprising an aluminum compound selected from the group consisting of basic aluminum carbonate gel and aluminum hydroxide, and a magnesium compound selected from the group consisting of basic hydrated magnesium carbonate and magnesium oxide, wherein the molar ratio of magnesium to aluminum is about 1.5 to 2.75, to a temperature of about 70° C. to about 95° C. and for a reaction time "X" to provide a first slurry, where "X" is a period of time sufficient to achieve removal of substantially all free and loosely bound carbon dioxide from the aqueous slurry;

(b) heating said first slurry to a temperature of about 125° C. to about 140° C. for about 1 to about 4 hours.

20. A solid solution according to claim 19, having an IR spectrum which displays a split absorption band in the region of 1415–1480 $cm^{-1}$ and having a crystallite size in the <003> direction of about 190 Å to about 225 Å.

* * * * *